US011455346B2

(12) United States Patent
McCain et al.

(10) Patent No.: US 11,455,346 B2
(45) Date of Patent: Sep. 27, 2022

(54) ADVANCED SEARCH AND DOCUMENT RETRIEVAL FOR DEVELOPMENT AND VERIFICATION SYSTEM PROTOTYPES

(71) Applicant: International Business Machines Corporation, Armonk, NY (US)

(72) Inventors: Edward C. McCain, Lagrangeville, NY (US); Ronald Asomah Dartey, Poughkeepsie, NY (US); Dominic Schroeder, Poughkeepsie, NY (US); Craig Slegel, Pleasant Valley, NY (US); Kyle Phillips, Poughkeepsie, NY (US); Adeoye O. Owolabi, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 284 days.

(21) Appl. No.: 16/835,493

(22) Filed: Mar. 31, 2020

(65) Prior Publication Data
US 2021/0303639 A1 Sep. 30, 2021

(51) Int. Cl.
G06F 16/93 (2019.01)
G06N 20/00 (2019.01)
(Continued)

(52) U.S. Cl.
CPC .............. G06F 16/93 (2019.01); G06F 3/167 (2013.01); G06F 21/31 (2013.01); G06N 20/00 (2019.01)

(58) Field of Classification Search
CPC ...... G06F 11/336; G06F 16/25; G06F 16/211; G06F 8/07; G06F 16/31; G06F 16/93; G06N 20/00; G06Q 10/06
See application file for complete search history.

(56) References Cited

U.S. PATENT DOCUMENTS 7,287,012 B2   10/2007  Corston et al.
8,185,523 B2    5/2012  Lu et al.
8,239,414 B2 *  8/2012  Liao .................... H04L 63/0815
                                                   707/791
(Continued)

OTHER PUBLICATIONS

Chaparro, W., "Teach Watson what results to surface: Use Relevancy training to train your private search collection.", Aug. 15, 2017 [Accessed Sep. 27, 2019], https://developer.ibm.com/tutorials/cc-cognitive-watson-relevancy-training/, 13 pages.

(Continued)

Primary Examiner — Hau H Hoang
(74) Attorney, Agent, or Firm — Cantor Colburn LLP; Edward Wixted

(57) ABSTRACT

Aspects of the invention include a method for providing a master computing environment containing a master repository. The method periodically conducts a search of proprietary data repositories and causes the master computing environment to create a merged collection in the master repository after the periodical conducted search of the proprietary data repositories. The method correlates metadata with the proprietary data repositories and puts the correlated metadata into the master repository. The method sets up a question feeder server to receive queries and to pass the queries to the master computing environment. The method causes the master computing environment to provide results in response to a query, where the master computing environment acts as an autonomous information provider that finds and sorts subject matter on a proprietary development project.

20 Claims, 9 Drawing Sheets

(51) Int. Cl.
*G06F 21/31* (2013.01)
*G06F 3/16* (2006.01)

(56) References Cited

U.S. PATENT DOCUMENTS

| | | |
|---|---|---|
| 8,645,905 B2 | 2/2014 | Halbedel |
| 2005/0234904 A1 | 10/2005 | Brill et al. |
| 2010/0057677 A1* | 3/2010 | Rapp ........................ G06F 16/25 |
| | | 707/E17.014 |
| 2011/0004588 A1 | 1/2011 | Leitersdorf et al. |
| 2014/0129536 A1 | 5/2014 | Anand et al. |
| 2020/0241872 A1* | 7/2020 | Muddakkagari ........ G06F 40/14 |

OTHER PUBLICATIONS

German, D. et al., "A Framework for Describing and Understanding Mining Tools in Software Development," In Proceedings of the 2005 international workshop on Mining software repositories (MSR '05). ACM, 1-5, 2005, 5 pages.

McCown, I., "Watson Discovery: Automatic Relevancy Ranking with Stack Exchange Data," Feb. 27, 2018 [Accessed Sep. 27, 2019] https://medium.com/with-watson/watson-discovery-automatic-relevancy-ranking-with-stack-exchange-data-f68ad045bfbe, 4 pages.

* cited by examiner

210

Documentation
Document Title: Architecture.pdf
Confidence Score: 40%
[Download]

Document Title: CoreLayout.pdf
Confidence Score: 35%
[Download]

...

Messages
Sender: John Smith    Date: 6/7/18
Message: The CPU is running much faster today.
Confidence Score: 36%

Sender: Larry Jones    Date: 2/23/18
Message: Let's remove the PU chips from TO3 today.
Confidence Score: 32%

...

Tickets
Ticket: 854732   Date: 3/4/19
Comment: I am not seeing any CPU's in this machine. Maybe the...
Confidence Score: 47%

Ticket: 861324   Date: 9/2/18
Comment: The rings show that core 6 is down on this CPU.
Confidence Score: 36%

...

CPU     [Send]

Tickets
Ticket: 854732  Date: 3/4/19
Comment: I am not seeing any CPU's in this machine. Maybe the...
Confidence Score: 47%

Documentation
Document Title: Architecture.pdf
Confidence Score: 40%
[Download]

Ticket
Ticket: 861324  Date: 9/2/18
Comment: The rings show that core 6 is down on this CPU.
Confidence Score: 36%

Messages
Sender: John Smith  Date: 6/7/18
Message: The CPU is running much faster today.
Confidence Score: 36%

Documentation
Document Title: CoreLayout.pdf
Confidence Score: 35%
[Download]

Messages
Sender: Larry Jones  Date: 2/23/18
Message: Let's remove the PU chips from TO3 today.
Confidence Score: 32%

...

| CPU | [Send] |

Tickets
Ticket: 854732  Date: 3/4/19
Comment: I am not seeing any CPU's in this machine. Maybe the...
Confidence Score: 47%

Documentation
Document Title Architecture.pdf
Confidence Score: 40%
[Download]

Documentation
Document Title: CoreLayout.pdf
Confidence Score: 35%
[Download]

Ticket
Ticket: 861324  Date: 9/2/18
Comment: The rings show that core 6 is down on this CPU.
Confidence Score: 36%

Messages
Sender: John Smith  Date: 6/7/18
Message: The CPU is running much faster today.
Confidence Score: 36%

Messages
Sender: Larry Jones  Date: 2/23/18
Message: Let's remove the PU chips from TO3 today.
Confidence Score: 32%
...

CPU  [Send]

FIG. 2C

ADVANCED SEARCH AND DOCUMENT RETRIEVAL FOR DEVELOPMENT AND VERIFICATION SYSTEM PROTOTYPES

BACKGROUND

The present invention generally relates to document search systems, and more specifically relates to advanced search and document retrieval for development and verification system prototypes.

SUMMARY

Embodiments of the present invention are directed to advanced search and document retrieval for development and verification system prototypes. A non-limiting example computer-implemented method includes providing a master computing environment containing a master repository. The method periodically conducts a search of proprietary data repositories and causes the master computing environment to create a merged collection in the master repository after the periodically conducted search of proprietary data repositories. The method correlates metadata with the proprietary data repositories and stores the correlated metadata into the master repository. The method sets up a question feeder server to receive queries and to pass the queries to the master computing environment. The method then causes the master computing environment to provide results in response to a query, where the master computing environment acts as an autonomous information provider that finds and sorts subject matter on a proprietary development project.

Other embodiments of the present invention implement features of the above-described method in computer systems and computer program products.

Additional technical features and benefits are realized through the techniques of one or more embodiments of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 2A-2C illustrate examples of displays showing results of advanced search and document retrieval for development and verification system prototypes in accordance with one or more embodiments of the present invention;

Figure 1:
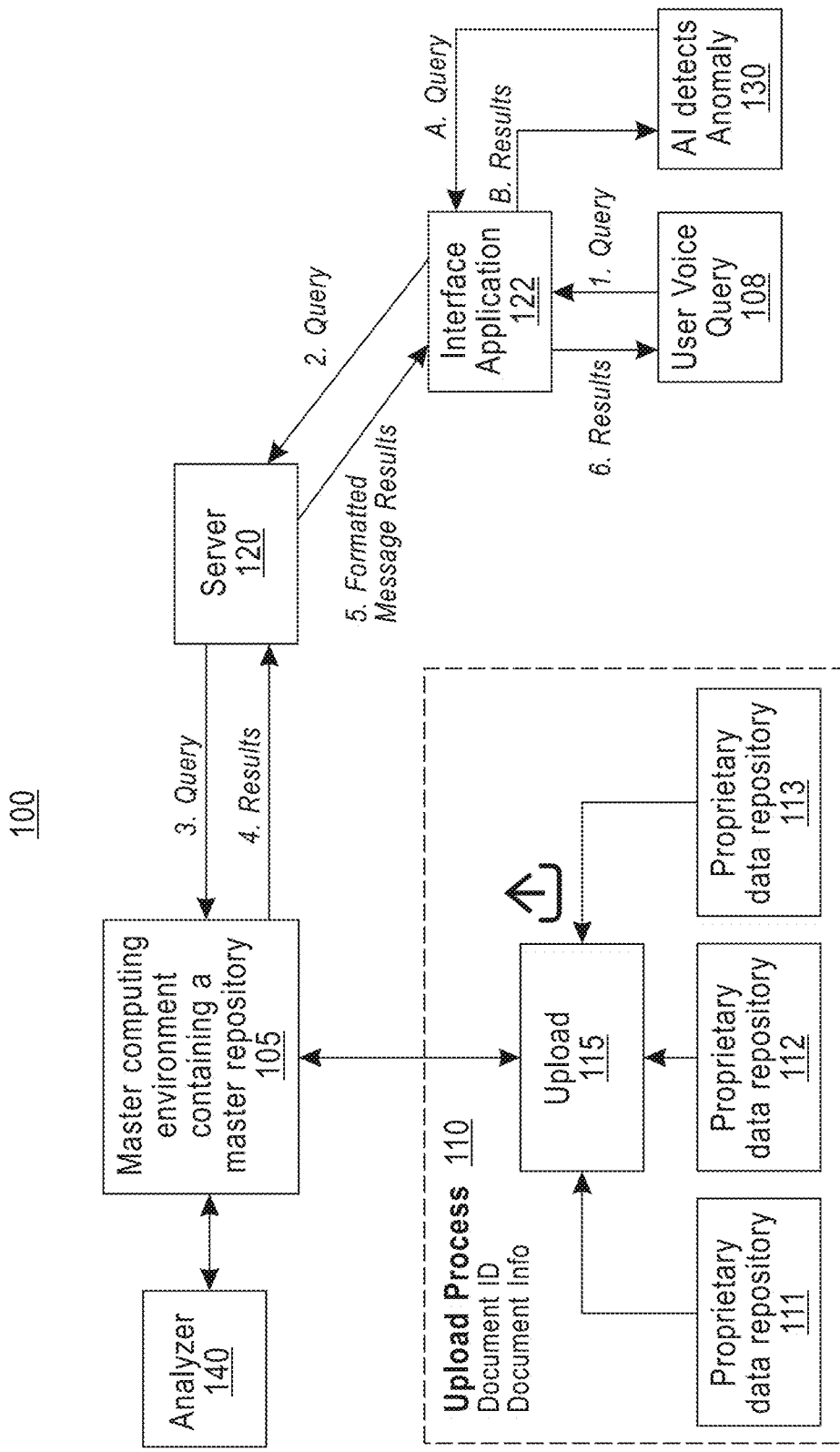
FIG. 1 illustrates a block diagram of components of an advanced search and document retrieval system for development and verification system prototypes in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide an autonomous information locator/information provider that finds and sorts relevant subject matter on a proprietary development project and allows an authorized user to access the information in real-time to aid in resolving an issue being investigated. The authorized user can access the information via an interface of a messaging platform, such as, but not limited to a SLACK® messaging application from Slack Technologies, Inc. One or more embodiments of the present invention is autonomous because it is designed to periodically query, format and upload documents to a master computing environment from approved internal documents, ticketing and messaging systems. The documents are then handled by the master computing environment and placed into a master database, also referred to as a master repository or master data repository. Ticketing can refer to the creation of defect tracking tickets that are logged to track defects and other issues which may be detected during testing or other operations.

Current processes of resolving an issue in a computing environment during development and testing can be a tedious and manual endeavor. Testers and developers can hit a variety of known and unknown issues daily. When the testers and developers encounter said issues they may query a ticketing system, query a documentation database and/or message the appropriate party for an answer. This querying, gathering of information and filtering of results is currently done manually by a person who is interested in or has encountered the issue of interest.

One or more embodiments of the present invention can eliminate the current manual and tedious labor of querying, finding, and filtering documents for the interested party. Instead, an overarching program can monitor systems under test. As a system under test encounters an issue, warning or exception, the overarching program is notified and can issue a query to one or more embodiments of the present invention. The query will then be processed by one or more embodiments of the present invention and in response thereto can further query, filter, and return appropriate documentation to a user of the system under test. This documentation can include proprietary documents, messages from a messaging system and ticket information.

One or more embodiments of the present invention provide a comprehensive approach to search and display proprietary documentation for consumption by humans and artificial intelligence systems. For proprietary documentation databases, one or more embodiments of the present invention can perform: security checks, term relevancy checks, optional display types, JavaScript Object Notation (JSON) style output, and voice, telephone query, or machine learning options. Examples of systems under test can include proprietary development projects such as, but not limited to, central processing unit (CPU) design and/or computer system architecture. Examples of proprietary documentation can include but are not limited to: principles of operation, design specifications, internal test program execution instructions, and instructions specifying steps to debug various types of problems. Further, examples of proprietary documentation databases can include, but are not limited to, IBM Connections, GITHUB® from Github, Inc., Rational Team Concert (RTC) Defect Tracking, and the like.

Development system prototypes and verification system prototypes can be part of a new development and testing process when creating a new mainframe/computing system or other such system under test. Developers and testers can migrate to a new development and testing process to help improve efficiency with resolving and identifying issues. Developers and testers who are working on various test systems can use this process to discover or encounter failures. They can analyze the relevant documents, tickets, or discussions related to failures or other defects discovered in the process.

One or more embodiments of the present invention can conduct aggregation of multiple repository sources into a master computing environment containing a master repository. One or more embodiments of the present invention can create a merged collection by merging repository sources, including metadata, and retrieving and returning a result to a user or an artificial intelligence (AI) based system. One or more embodiments of the present invention can collect documents and/or conversations from multiple sources. One or more embodiments of the present invention can be built for use in a chat application framework. One or more embodiments of the present invention can capture failed searches such that administrators are able to debug why a search failed, and if necessary, add missing relevant documentation.

Turning now to FIG. 1, a block diagram of an advanced search and document retrieval system 100 for development and verification system prototypes is generally shown in accordance with one or more embodiments of the present invention. A master computing environment containing a master data repository 105 is set up to receive queries and supply the results. The initial training of the master computing environment containing a master data repository 105 will be described hereafter. The master computing environment containing the master data repository 105 receives additional proprietary data via periodic uploads 115 from a plurality of proprietary data repositories 111, 112, 113. The additional proprietary data can include subject matter documents and metadata from data repositories from various project management programs and chat communications programs. Examples of metadata can include the name of the proprietary data repositories 111-113 from which a file or other data is uploaded, a file type, a data type, a channel identifier, a community identifier, an organization identifier, a defect identifier, a tracking identifier, a uniform resource locator link to underlying or related data and/or files, a file size, a data size, a modification date, an upload date, a creation date, an owner identification, a creator identification, permission information, various tags, keywords, and/or other such information. Although three proprietary data repositories 111-113 are depicted in the example of FIG. 1, it will be understood that any number of proprietary data repositories can be incorporated is various embodiments of the present invention. The proprietary data repositories 111-113 may each include different types of data with different formatting and access interfaces. For example, proprietary data repository 111 may store defect tracking tickets in a first format, proprietary data repository 112 may store documents in a second format, and proprietary data repository 113 may hold messages in a third format.

Still referring to FIG. 1, the advanced search and document retrieval system 100 for development and verification system prototypes can be configured to receive a query from a user 108 at an interface application 122. The interface application 122 can then pass the query to a server 120 (also referred to as a question feeder server 120), which may adjust formatting of the query and pass the query to the master computing environment containing the master data repository 105. The master computing environment containing the master data repository 105 can respond to the query by supplying results back to the server 120. The server 120 can then format the results and send the results back to the user 108 via the interface application 122. In an alternate embodiment, the query of the user 108 can take the form of a voice query and results can be received in the form of an audio playback of the results and/or visual depiction of the results. The interface application 122 can also receive queries from an artificial intelligence (AI) system 130. The query of the AI system 130 can be passed to the master computing environment containing the master data repository 105 via the interface application 122 and server 120. Similar to processing a user query input, the master computing environment containing the master data repository 105 can supply results in response to a query of the AI system 130 back through the server 120 and the interface application 122. The AI system 130 can be configured to detect an anomaly from various sources.

The advanced search and document retrieval system 100 can also include an analyzer 140 configured to train the master computing environment containing a master data repository 105 as further described herein. The analyzer 140 may be part of the master computing environment containing a master data repository 105 or implemented separately. The analyzer 140 and/or master computing environment containing a master data repository 105 can include one or more underlying computer systems and/or cloud computing resources.

FIGS. 2A-2C illustrate examples of displays showing results for the advanced search and document retrieval system 100 of FIG. 1 for development and verification system prototypes that are presented to a user in accordance with one or more embodiments of the present invention. In FIG. 2A, results 210 shown are sorted by type in a message. For example, multiple documentation results, multiple message results, and multiple tickets are each grouped by type in the example of FIG. 2A. In FIG. 2B, results 212 shown are sorted by relevancy in a message. As can be seen in FIG. 2B, the results 212 alternate between tickets, documentation, and messages based on a confidence score. In FIG. 2C, results 214 shown are sorted by the number of times the keyword of "CPU" appears, which can differ from the confidence scores with tickets, documentation, and messages mixed based on the results.

Figure 3:
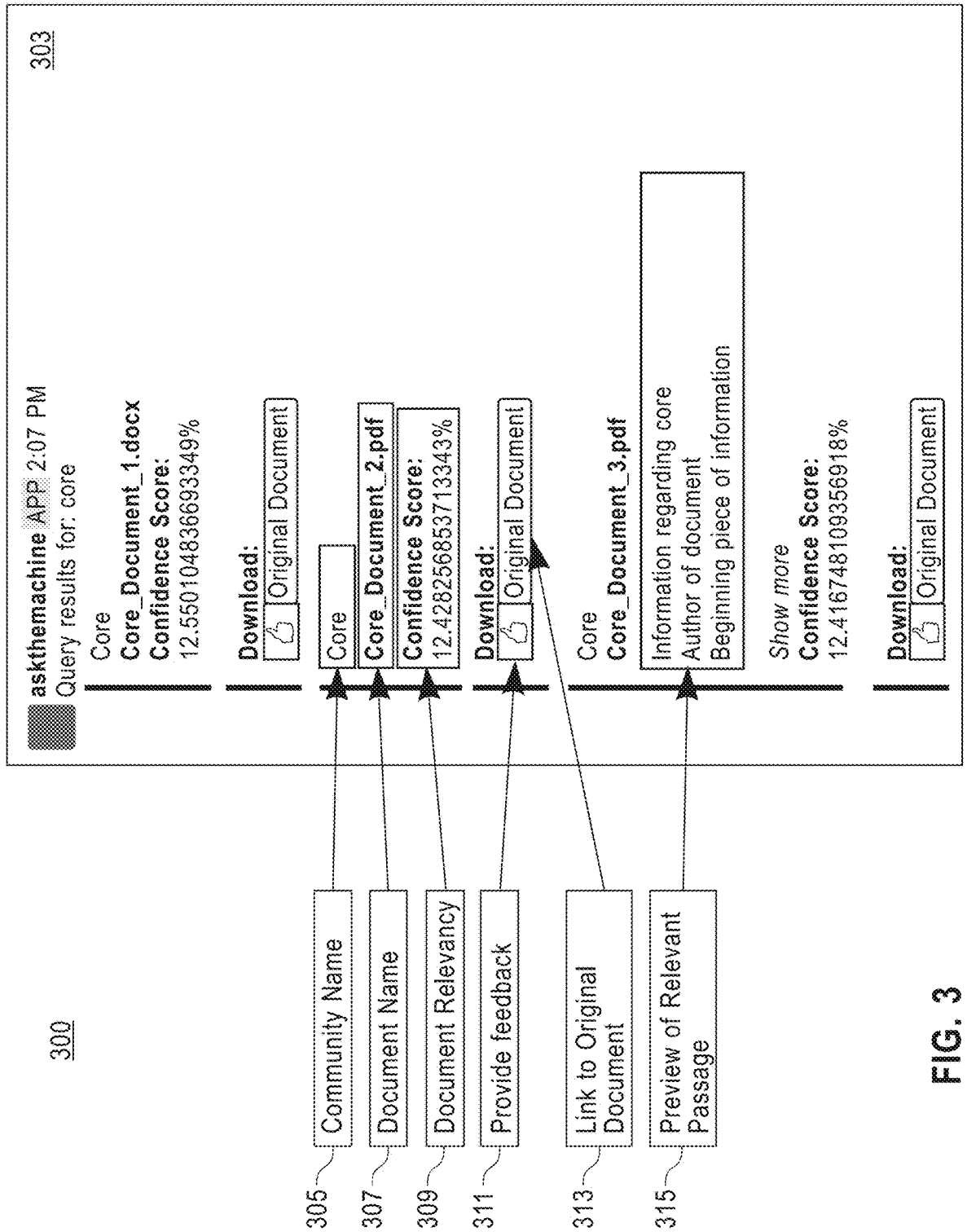
FIG. 3 illustrates a specific result diagram of an advanced search and document retrieval system for development and verification system prototypes in accordance with one or more embodiments of the present invention.

Referring to FIG. 3, shown is an illustrated example of a result 300 of the advanced search and document retrieval system 100 of FIG. 1 for development and verification system prototypes in accordance with one or more embodiments of the present invention. A document result 303 can be received from the interface application 122 of FIG. 1 and presented to a user interface of the user 108 of FIG. 1 in response to a query from the user 108. As shown in FIG. 3, the document result 303 refers to a single document and can include a community name 305, document name 307, document relevancy 309 and a preview of the relevant passage 315. In addition, the document result 303 can include a link to the original document 313 and a user feedback button 311. The community name 305 can refer to an organization that certain individuals may have proper authentication to access. The document relevancy 309 can be a value received from an entity that calculates relevancy scores. In accordance with one or more embodiments of the present invention, the relevant passage 315 can be determined based on usage of context from the original query, as well as previous training data to predict which passage will likely be most relevant. The user feedback button 311 can be used to avoid an individual using a mock-up of some basic training data and instead, utilizing real-time data. The user feedback button 311 can be implemented by using a mouse to select an on-screen button or a touch screen. Selecting the user feedback button 311 can result in logging data that may be used to determine relevance for making updates.

Figure 4:
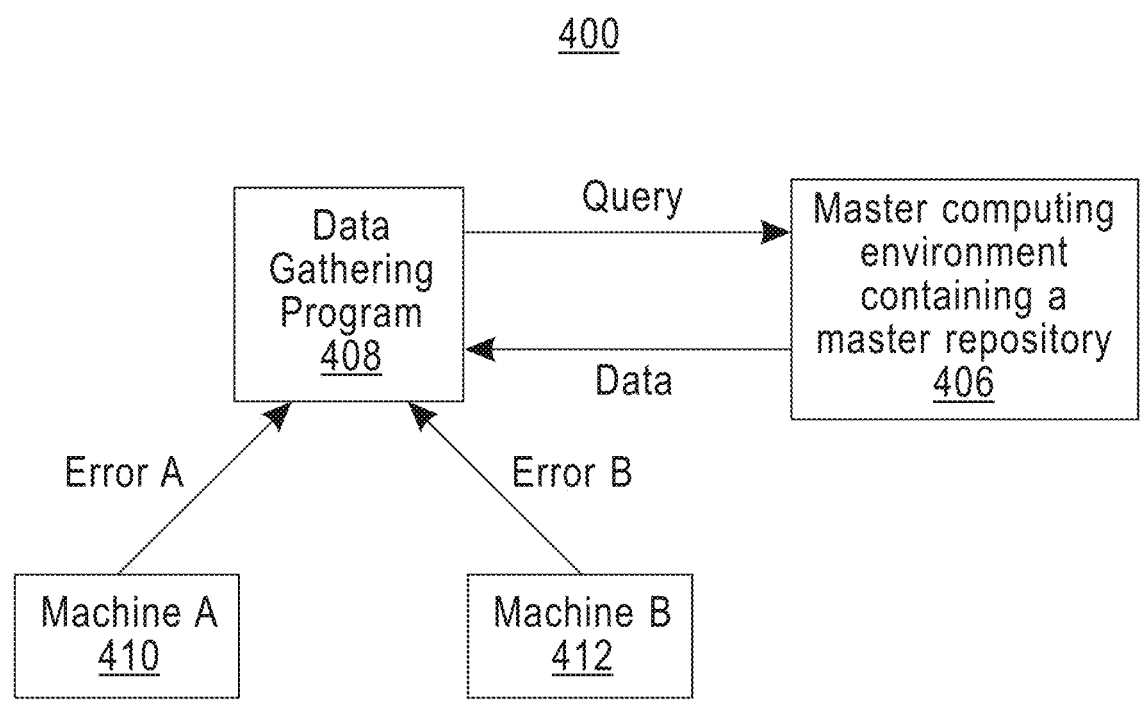
FIG. 4 illustrates another block diagram of components of an advanced search and document retrieval system for development and verification system prototypes in accordance with one or more embodiments of the present invention.

Turning now to FIG. 4, an advanced search and document retrieval system 400 for development and verification system prototypes is generally shown in accordance with one or more embodiments of the present invention. The system 400 may also include other elements, such as previously described with respect to the system 100 of FIG. 1. A master computing environment containing the master data repository 406 can receive queries from a data gathering program 408 and can supply a response in the form of ticketing information data to the data gathering program 408. The data gathering program 408 can also receive failed error query messages from machines 410 and 412. The data gathering program 408 can refer to a higher-level application used to monitor each individual machine 410, 412. If the machine 410, 412 receives an error/issue, it can notify a corresponding higher-level application of the error. The machines 410, 412 are examples of systems under test, such as mainframe computer systems.

One or more embodiments of the invention can replace the manual and tedious labor of querying, finding and filtering documents for an interested party with an overarching program that monitors each machine 410, 412. As a machine 410, 412 encounters an issue, warning or exception, the overarching program (e.g., the data gathering program 408) can be informed and issue a query to the master computing environment containing a master data repository 406. The query can be processed, and the appropriate documentation is returned to the user of the machine 410, 412. The documentation can include proprietary documents, messages from a messaging system and/or ticket information.

Figure 5:
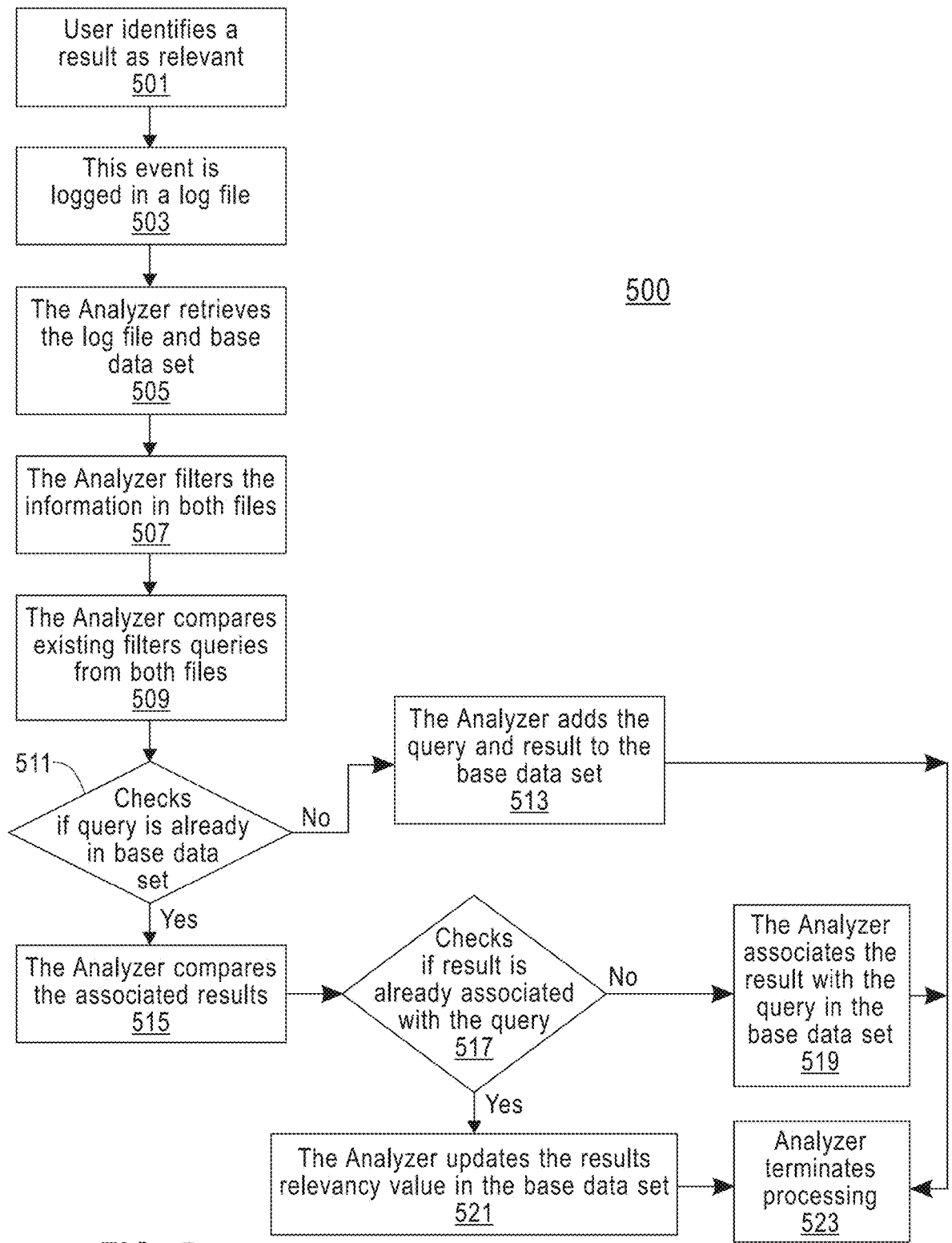
FIG. 5 illustrates a flow diagram of training for a master computing environment containing a master data repository in accordance with one or more embodiments of the present invention.

Turning now to FIG. 5, a flow diagram 500 for initial and continued training for a master computing environment containing a master data repository 105 of FIG. 1 is generally shown in accordance with an embodiment of the present invention. The flow diagram 500 shown in FIG. 5 can be utilized to train the master computing environment without requiring manual relevancy determination from the owners(s)/developer(s). The process depicted in flow diagram 500 can provide a user with relevant results from the master computing environment in response to a query. The user can review the results and provide feedback to the master computing environment through the usage of various interfaces, such as a button, which can be displayed in messages. A server can log associated information in a log file for utilization and statistics. The process depicted in the flow diagram 500 can be performed, for example, by the analyzer 140 and other elements of FIG. 1.

Still referring to FIG. 5, after the master computing environment creates a log file with the user's identification of what is relevant, other users can extract this information. In addition, the process can update the master data repository's base training data set. An analyzer, such as analyzer 140, which may be part of the master computing environment, can access the master computing environment's log file and the specified collection's base training data set. Many user-crafted queries may have a lot of "noise", meaning words which for the most part are not useful to the query. Examples of such words include "what", "where" and many other commonly used words. Therefore, the analyzer utilizes some common libraries to filter out those words in both the base data set and the log file. This is important because users can utilize some common libraries to aid in identifying which queries have already been added to the collection's base data set. If the query was already in the collection's base data set, then the analyzer checks if the same document was already identified as relevant for this query. If the document has been identified as relevant, then the analyzer updates the relevancy value associated with the document. Otherwise, the document is then associated with the query as relevant. This process continues until queries with relevant documents have been updated or added to the collection's base data set.

The process of using the analyzer in the training of the master computing environment starts at block 501 of FIG. 5 by having a user identify that a result is relevant. In block 503, the event is logged in a log file. In block 505, the analyzer retrieves the log file and base data set. In block 507, the analyzer filters the information in both files. In block 509, the analyzer compares existing filters queries from both files. In a decision block 511, there is a check to see if the query is already in base data set. If the answer is "no", then in block 513, the analyzer adds the query and result to the base data set. Then in block 523, the analyzer terminates any further processing. If the answer is "yes" from the decision block 511, the analyzer compares the associated results in block 515. In decision block 517, the process checks to see if the results are already associated with the query. If the answer is "no", then in block 519, the analyzer associates the result with the query in the base data set. Then in block 523, the analyzer terminates any further processing. If the answer is "yes" at decision block 517, then in block 521, the analyzer updates the results relevancy value in the base data set. Then in block 523, the analyzer terminates any further processing.

Figure 6:
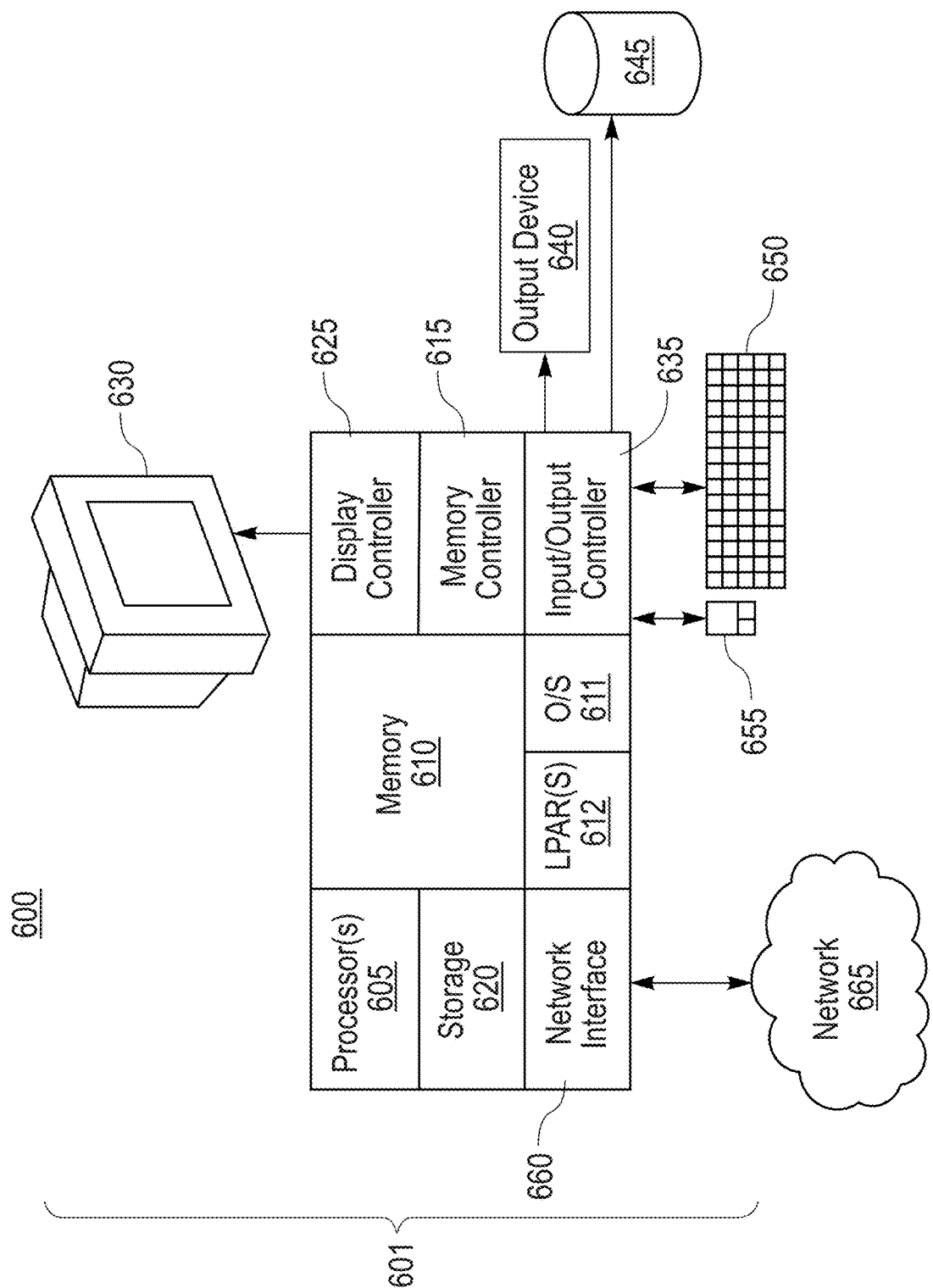
FIG. 6 illustrates a computer system environment in accordance with one or more embodiments of the present invention.

Turning now to FIG. 6, a computer system 600 for advanced search and document retrieval is generally shown in accordance with one or more embodiments of the present invention. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 600 therefore may include general-purpose computer or mainframe 601 capable of running multiple instances of an O/S simultaneously.

In an exemplary embodiment, in terms of hardware architecture, as shown in FIG. 6, the computer 601 includes one or more processors 605, memory 610 coupled to a memory controller 615, and one or more input and/or output (I/O) devices 640, 645 (or peripherals) that are communicatively coupled via a local input/output controller 635. The input/output controller 635 can be, for example but not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 635 may include a plurality of sub-channels configured to access the output devices 640 and 645. The sub-channels may include fiber-optic communications ports.

The processor 605 is a hardware device for executing software, particularly that stored in storage 620, such as cache storage, or memory 610. The processor 605 can be any custom made or commercially available processor, a central processing unit (CPU), an auxiliary processor among several processors associated with the computer 601, a semiconductor-based microprocessor (in the form of a microchip or chip set), a macro processor, or generally any device for executing instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, and/or other types of storage media. Note that the memory 610 can have a distributed architecture, where various components are situated remote from one another, but can be accessed by the processor 605.

The instructions in memory 610 may include one or more separate programs, each of which comprises an ordered listing of executable instructions for implementing logical functions. In the example of FIG. 6, the instructions in the memory 610 a suitable operating system (OS) 611. The operating system 611 essentially controls the execution of other computer programs and provides scheduling, input-output control, file and data management, memory management, and communication control and related services.

The memory 610 may include multiple logical partitions (LPARs) 612, each running an instance of an operating system. The LPARs 612 may be managed by a hypervisor, which may be a program stored in memory 610 and executed by the processor 605.

In an exemplary embodiment, a conventional keyboard 650 and mouse 655 can be coupled to the input/output controller 635. Other output devices such as the I/O devices 640, 645 may include input devices, for example but not limited to a printer, a scanner, microphone, and the like. Finally, the I/O devices 640, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 600 can further include a display controller 625 coupled to a display 630. In an exemplary embodiment, the system 600 can further include a network interface 660 for coupling to a network 665. The network 665 can be an IP-based network for communication between the computer 601 and any external server, client and the like via a broadband connection. The network 665 transmits and receives data between the computer 601 and external systems. In an exemplary embodiment, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the instructions in the memory 610 may further include a basic input output system (BIOS) (omitted for simplicity). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute instructions stored within the memory 610, to communicate data to and from the memory 610, and to generally control operations of the computer 601 pursuant to the instructions.

Figure 7:
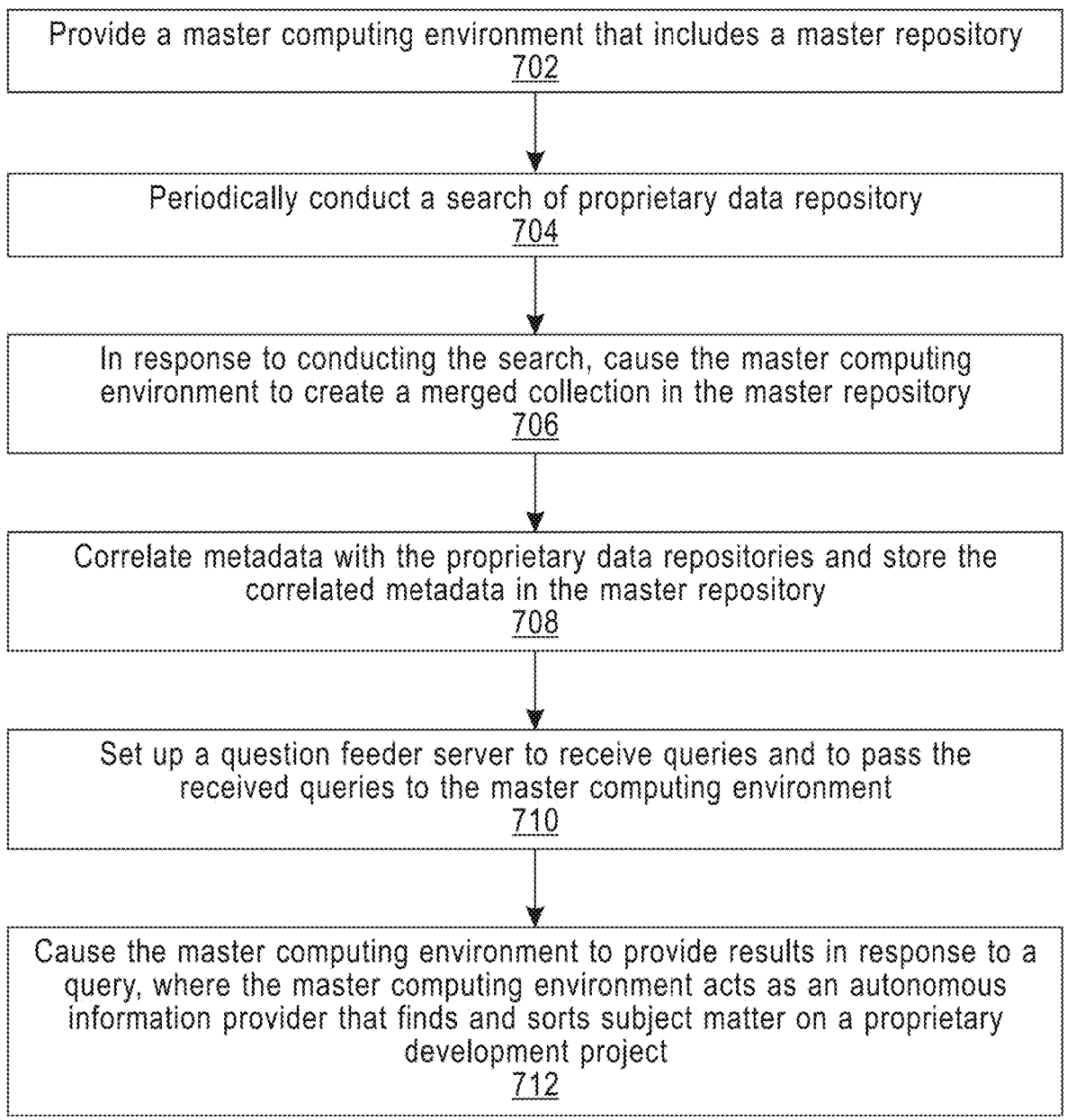
FIG. 7 illustrates a flow diagram of advanced search and document retrieval for development and verification system prototypes in accordance with one or more embodiments of the present invention.

FIG. 7 is a flow diagram that depicts a process 700 for advanced search and document retrieval for development and verification system prototypes according to one or more embodiments of the present invention. The process 700 can be performed by the advanced search and document retrieval system 100 of FIG. 1, the advanced search and document retrieval system 400 of FIG. 4, and/or other system variations. For purposes of explanation, process 700 is described primarily with respect to advanced search and document retrieval system 100 and with reference to FIGS. 1-6.

At block 702, a master computing environment that includes a master data repository 105 is provided. The master computing environment can manage identifications and authenticates users, such as user 108. At block 704, a search of proprietary data repositories 111-113 is periodically conducted. At block 706, in response to conducting the search, the master computing environment can create a merged collection in the master repository. At block 708, metadata can be correlated with the proprietary data repositories 111-113, and the correlated metadata can be stored in the master repository. At block 710, a question feeder server, such as server 120, is set up to receive queries and to pass the received queries to the master computing environment that includes the master data repository 105. At block 712, the master computing environment is caused to provide results in response to a query, where the master computing environment acts as an autonomous information provider that finds and sorts subject matter on a proprietary development project. The provided results can be sorted by relevancy.

Embodiments can also include providing an interface to allow an authorized user to provide the query and receive the results, such as through interface application 122. The interface can further interface with other machine learning applications to provide further information on error events, such as AI system 130. The interface can receive the query as a voice input and supply the results as a voice output. Embodiments can also include receiving user feedback regarding the relevancy of the provided results.

The process flow diagram of FIG. 7 is not intended to indicate that the operations of the process 700 are to be executed in any particular order, or that all of the operations of the process 700 are to be included in every case. Additionally, the process 700 can include any suitable number of additional operations.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and an embodiment of the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

One or more embodiments of the present invention may be a system, a method, and/or a computer program product at any possible technical detail level of integration. The computer program product may include a computer readable storage medium (or media) having computer readable program instructions thereon for causing a processor to carry out aspects of an embodiment of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of an embodiment of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects for one or more embodiments of the present invention.

Aspects of one or more embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
providing a master computing environment that includes a master repository;
periodically conducting a search of proprietary data repositories;
in response to conducting the search, causing the master computing environment to create a merged collection in the master repository;
correlating metadata with the proprietary data repositories and storing the correlated metadata in the master repository;
setting up a question feeder server to receive queries and to pass the received queries to the master computing environment; and
causing the master computing environment to provide results in response to a query, wherein the master computing environment acts as an autonomous information provider that finds and sorts subject matter on a proprietary development project, and further wherein training of the master computing environment is updated based on collecting a plurality of queries and results as a base data set, logging a user identification of a query result to the query as relevant, updating an association between the query result and the query in the base data set based on determining that the query result is unassociated with the query in the base data set, and updating a results relevancy value in the base data set based on an existing association between the query result to the query being located in the base data set.

2. The computer-implemented method of claim 1, further comprising providing an interface to allow an authorized user to provide the query and receive the results.

3. The computer-implemented method of claim 2, wherein the interface further interfaces with other machine learning applications to provide further information on error events.

4. The computer-implemented method of claim 2, wherein the interface receives the query as a voice input and supplies the results as a voice output.

5. The computer-implemented method of claim 1, wherein the master computing environment manages identifications and authenticates users.

6. The computer-implemented method of claim 1, wherein the provided results are sorted by relevancy, the method further comprising:
receiving user feedback regarding the relevancy of the provided results.

7. The computer-implemented method of claim 1, wherein the proprietary data repositories comprise a first proprietary data repository that stores defect tracking in a first format, a second proprietary data repository that stores documents in a second format, and a third proprietary data repository that stores messages in a third format, and further wherein each of the first proprietary data repository, the second proprietary data repository, and the third proprietary data repository have a different access interface.

8. A system comprising:
a master computing environment comprising a master repository having computer readable instructions; and
one or more processors for executing the computer readable instructions, the computer readable instructions controlling the one or more processors to perform operations comprising:
periodically conducting a search of proprietary data repositories;
causing the master computing environment to create a merged collection in the master repository after the periodically conducted search of the proprietary data repositories;
correlating metadata with the proprietary data repositories and putting the correlated metadata into the master repository;
setting up a question feeder server to receive queries and pass the queries to the master computing environment; and
causing the master computing environment to provide results in response to a query, wherein the master computing environment acts as an autonomous information provider that finds and sorts subject matter on a proprietary development project, and further wherein training of the master computing environment is updated based on collecting a plurality of queries and results as a base data set, logging a user identification of a query result to the query as relevant, updating an association between the query result and the query in the base data set based on determining that the query result is unassociated with the query in the base data set, and updating a results relevancy value in the base data set based on an existing association between the query result to the query being located in the base data set.

9. The system of claim 8, wherein the operations further comprise providing an interface to allow an authorized user to provide the query and receive the results.

10. The system of claim 9, wherein the interface further interfaces with other machine learning applications to provide further information on error events.

11. The system of claim 9, wherein the interface receives the query as a voice input and supplies the results as a voice output.

12. The system of claim 8, wherein the master computing environment manages identifications and authenticates users.

13. The system of claim 8, wherein the provided results are sorted by relevancy, and the operations further comprise receiving user feedback regarding the relevancy of the provided results.

14. The system of claim 8, wherein the proprietary data repositories comprise a first proprietary data repository that stores defect tracking in a first format, a second proprietary data repository that stores documents in a second format, and a third proprietary data repository that stores messages in a third format, and further wherein each of the first proprietary data repository, the second proprietary data repository, and the third proprietary data repository have a different access interface.

15. A computer program product comprising a computer readable storage medium having program instructions embodied therewith, the program instructions executable by a master computing environment comprising a master repository to cause the master computing environment to perform operations comprising:
periodically conducting a search of proprietary data repositories;
causing the master computing environment to create a merged collection in the master repository after the periodically conducted search of the proprietary data repositories;
correlating metadata with the proprietary data repositories and putting the correlated metadata into the master repository;

setting up a question feeder server to receive queries and pass the queries to the master computing environment; and causing the master computing environment to provide results in response to a query, wherein the master computing environment acts as an autonomous information provider that finds and sorts subject matter on a proprietary development project, and further wherein training of the master computing environment is updated based on collecting a plurality of queries and results as a base data set, logging a user identification of a query result to the query as relevant, updating an association between the query result and the query in the base data set based on determining that the query result is unassociated with the query in the base data set, and updating a results relevancy value in the base data set based on an existing association between the query result to the query being located in the base data set.

16. The computer program product of claim 15, wherein the operations further comprise providing an interface to allow an authorized user to provide the query and receive the results.

17. The computer program product of claim 16, wherein the interface further interfaces with other machine learning applications to provide further information on error events.

18. The computer program product of claim 16, wherein the interface receives the query as a voice input and supplies the results as a voice output.

19. The computer program product of claim 15, wherein the master computing environment manages identifiers and authenticates users, and wherein the operations further comprise receiving user feedback regarding the relevancy of the provided results.

20. The computer program product of claim 15, wherein the proprietary data repositories comprise a first proprietary data repository that stores defect tracking in a first format, a second proprietary data repository that stores documents in a second format, and a third proprietary data repository that stores messages in a third format, and further wherein each of the first proprietary data repository, the second proprietary data repository, and the third proprietary data repository have a different access interface.

* * * * *